(12) United States Patent
Ramanathan et al.

(10) Patent No.: US 8,958,337 B1
(45) Date of Patent: Feb. 17, 2015

(54) SCALABLE METHOD TO SUPPORT MULTI-DEVICE LINK AGGREGATION

(75) Inventors: Shankar Ramanathan, Bangalore (IN);
Srinivas Chinnam, Bangalore (IN);
Manish Singh, Bangalore (IN);
Harshad Nakil, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1078 days.

(21) Appl. No.: 12/977,493

(22) Filed: Dec. 23, 2010

(51) Int. Cl.
*H04L 12/28* (2006.01)
*G06F 15/16* (2006.01)
*H04L 12/24* (2006.01)
*H04L 12/801* (2013.01)

(52) U.S. Cl.
CPC ............... *H04L 12/24* (2013.01); *H04L 47/10* (2013.01)
USPC ........... 370/254; 370/252; 370/256; 370/351; 370/389; 370/392; 370/218; 370/401; 370/402; 709/201; 709/229; 709/249

(58) Field of Classification Search
CPC ......... H04L 12/12; H04L 12/28; H04L 49/00; H04L 49/65; H04L 49/70; H04L 45/66; H04L 49/351; H04L 45/20; H04L 41/0803; H04L 41/0826; H04L 41/145; H04L 41/147; H04L 12/5695; H04L 41/0893; H04L 67/1097; H04L 12/462; G06F 11/2007; G10D 1/00; G10H 1/0008
USPC ........................ 370/228–403; 709/201–249
See application file for complete search history.

(56) References Cited

U.S. PATENT DOCUMENTS

| | | | | |
|---|---|---|---|---|
| 7,179,982 | B2 * | 2/2007 | Goto | 84/616 |
| 7,411,915 | B1 * | 8/2008 | Spain et al. | 370/250 |
| 7,532,586 | B2 * | 5/2009 | Ou et al. | 370/254 |
| 7,643,468 | B1 * | 1/2010 | Arregoces et al. | 370/351 |
| 8,040,820 | B2 * | 10/2011 | Pratap et al. | 370/254 |
| 8,108,895 | B2 * | 1/2012 | Anderson et al. | 725/36 |
| 8,312,145 | B2 * | 11/2012 | Rabie et al. | 709/227 |
| 8,369,335 | B2 * | 2/2013 | Jha et al. | 370/392 |
| 8,514,743 | B2 * | 8/2013 | Raman et al. | 370/254 |
| 8,705,526 | B1 * | 4/2014 | Hasan | 370/389 |
| 2005/0058149 | A1 * | 3/2005 | Howe | 370/428 |
| 2005/0160171 | A1 * | 7/2005 | Rabie et al. | 709/227 |
| 2005/0241465 | A1 * | 11/2005 | Goto | 84/616 |
| 2007/0014247 | A1 * | 1/2007 | Ou et al. | 370/254 |
| 2008/0120129 | A1 * | 5/2008 | Seubert et al. | 705/1 |
| 2009/0080338 | A1 * | 3/2009 | Parker et al. | 370/250 |
| 2011/0235523 | A1 * | 9/2011 | Jha et al. | 370/242 |
| 2011/0310729 | A1 * | 12/2011 | Raman et al. | 370/225 |
| 2012/0106363 | A1 * | 5/2012 | Diab | 370/252 |

* cited by examiner

*Primary Examiner* — Venkatesh Haliyur
(74) *Attorney, Agent, or Firm* — Harrity & Harrity, LLP

(57) ABSTRACT

A network device determines whether the network device has a local link for a link aggregation group (LAG), and identifies, when the network device has a local link for the LAG, the network device as a designated forwarder for the LAG. The network device also identifies, when the network device does not have a local link for the LAG, a closest network device to the network device, with a local link for the LAG, as the designated forwarder for the LAG.

20 Claims, 9 Drawing Sheets

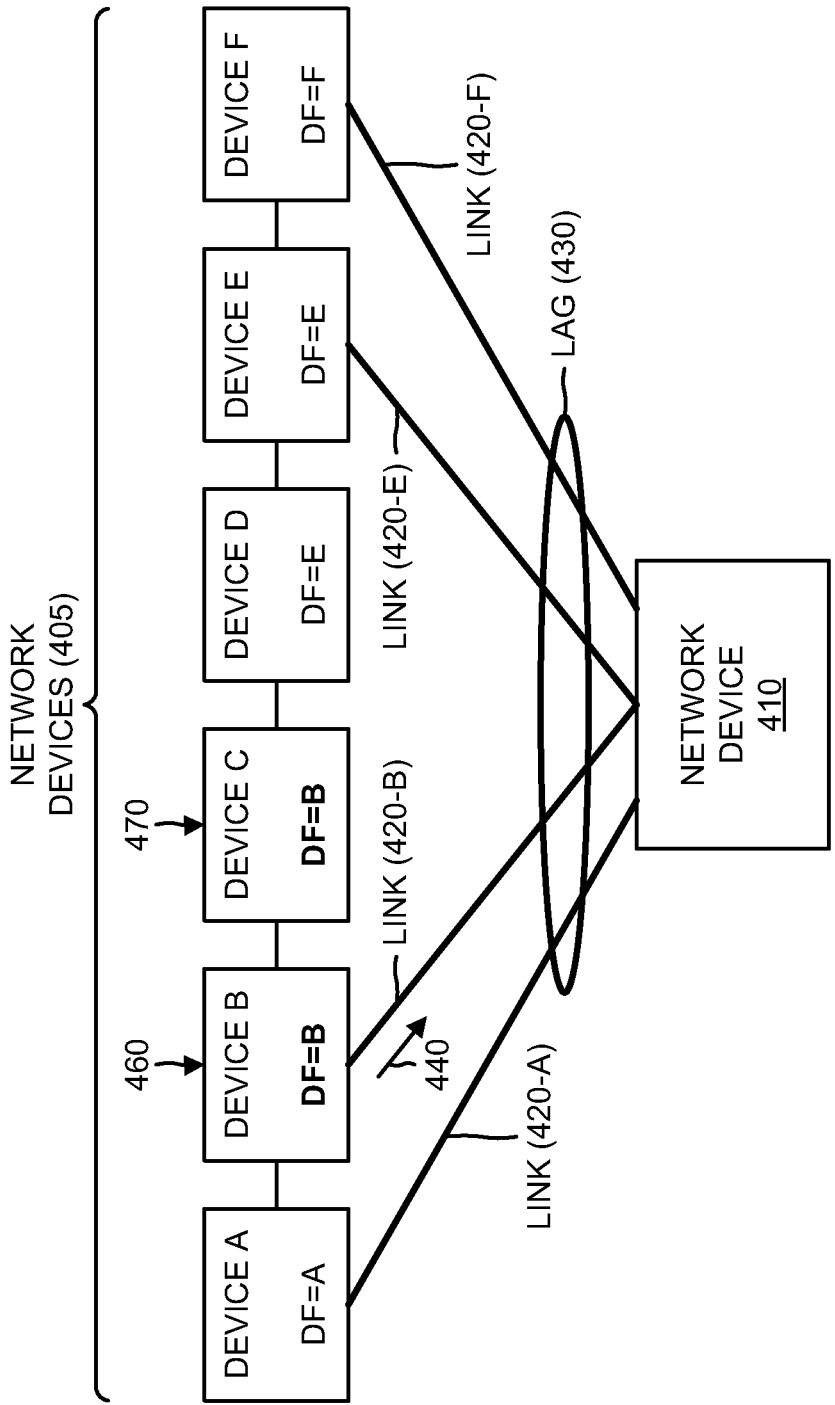

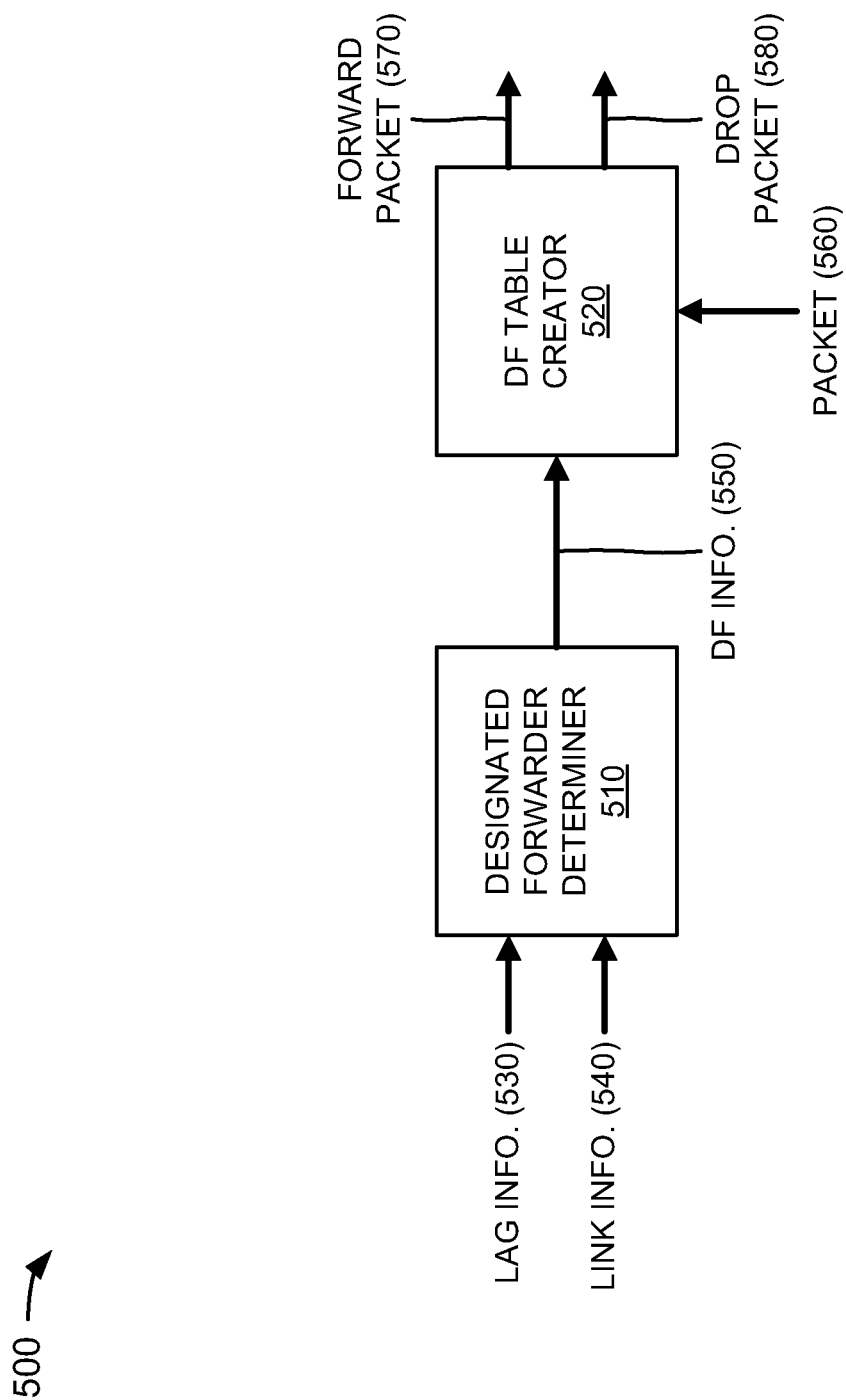

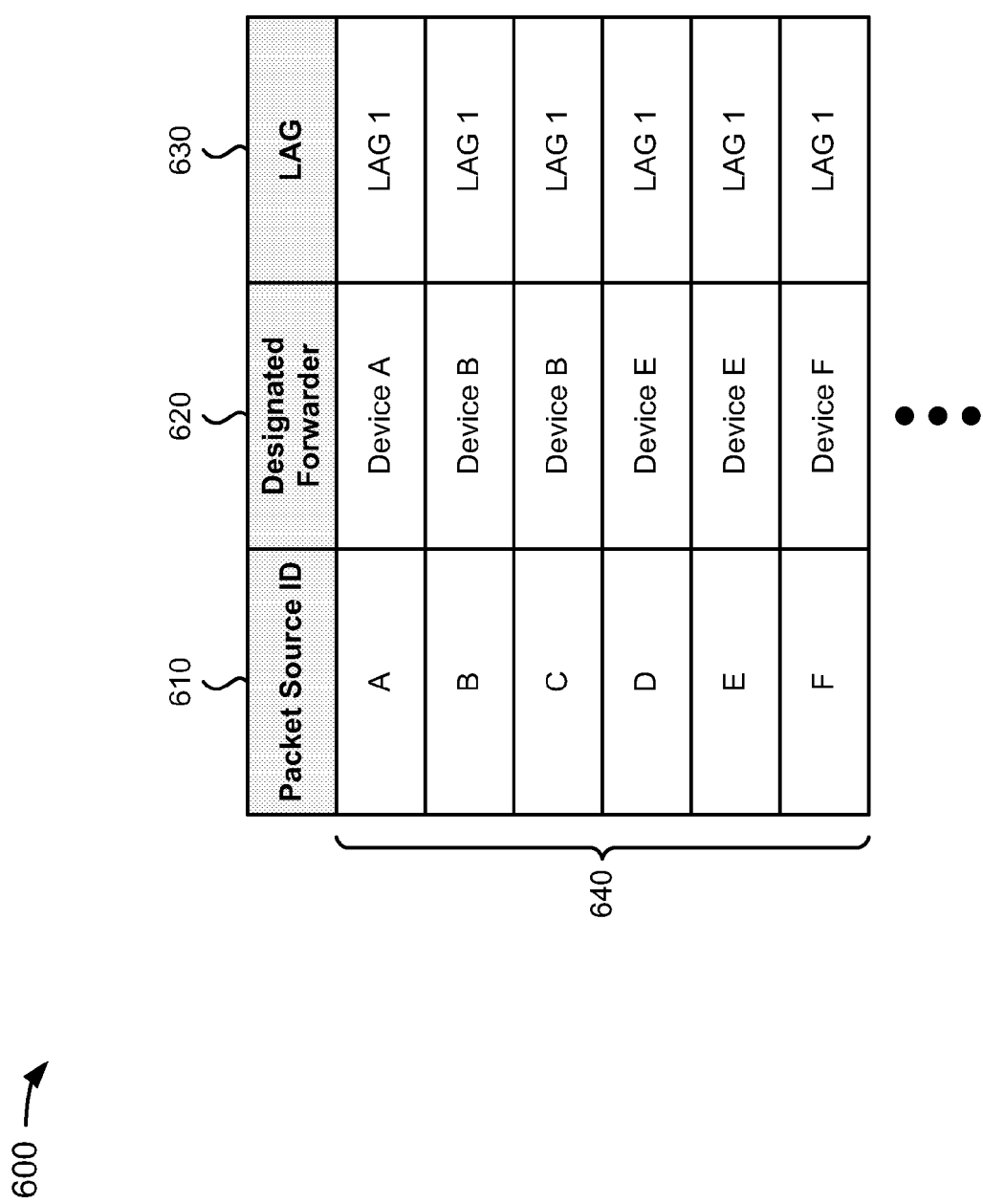

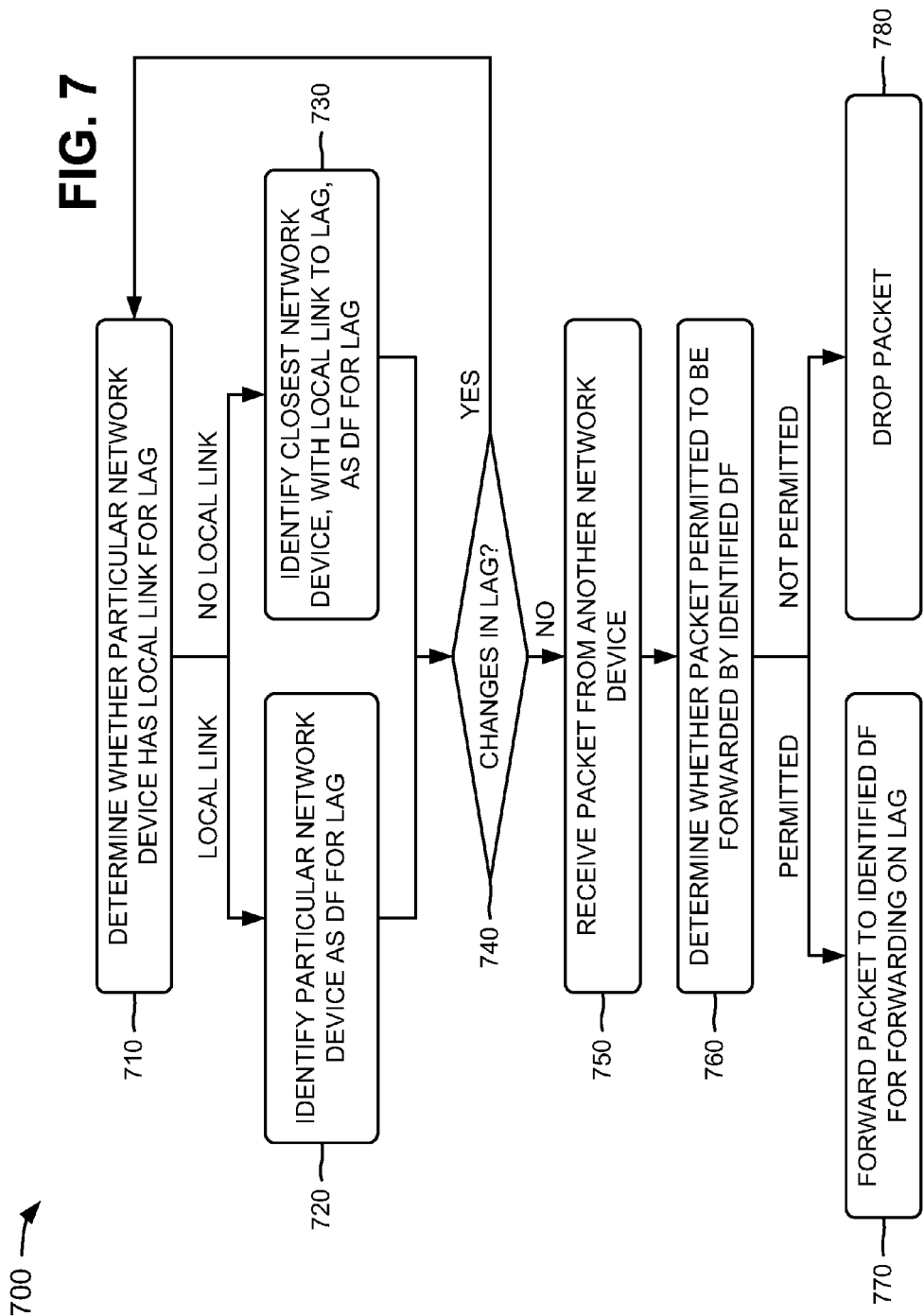

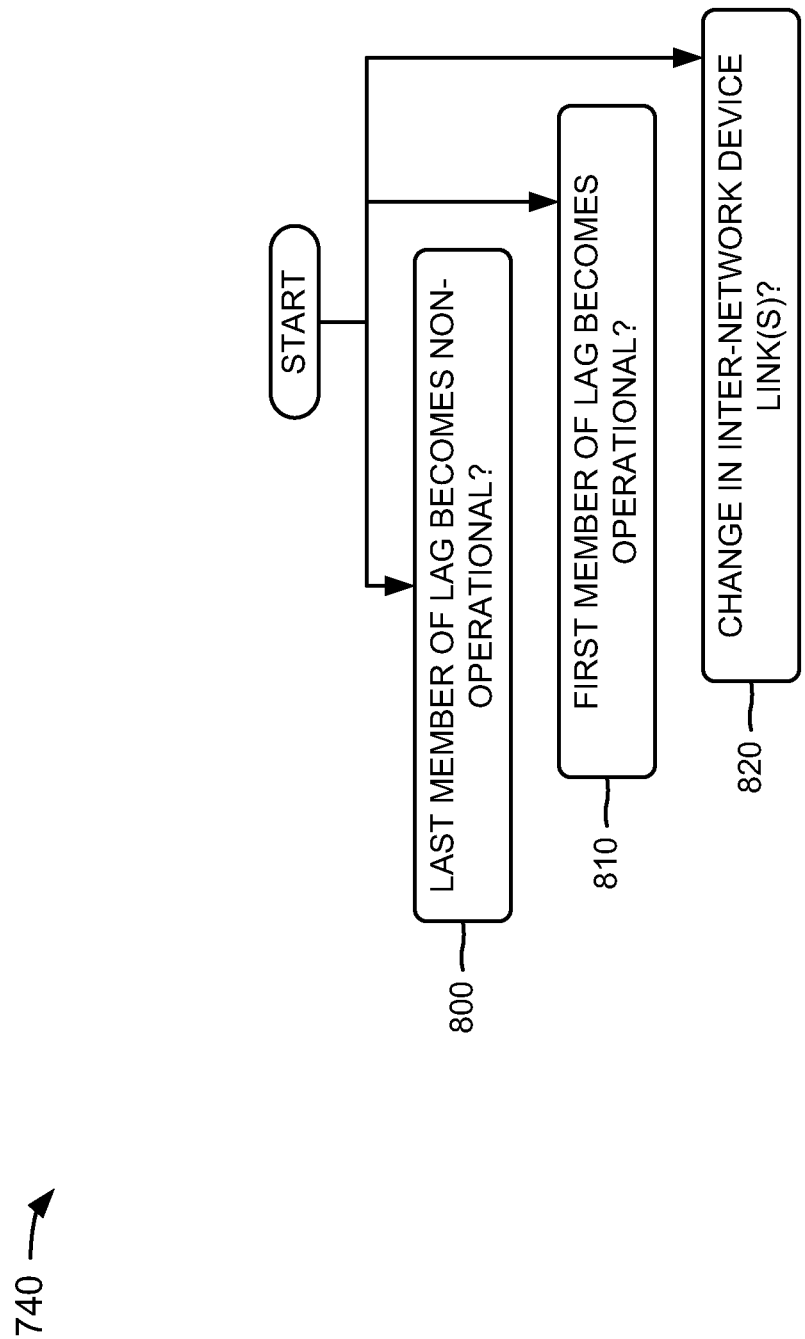

SCALABLE METHOD TO SUPPORT MULTI-DEVICE LINK AGGREGATION

BACKGROUND

Large data center and enterprise networks (e.g., service provider networks) following a two or three tier architecture (e.g., an access layer, an aggregation layer, and a core layer) typically have more than one network device (e.g., a chassis, a switch, a router, etc.) at the aggregation layer. Such an arrangement provides network device-level resiliency. Access layer network devices will typically have connections (e.g., links) to all the aggregation layer network devices for link-level and device-level resiliency. Furthermore, the aggregation layer network devices are interconnected by links which are in the forwarding state all the time. Therefore, if a protocol (e.g., a spanning tree protocol (STP) or other protocols) is executed between two aggregation layer network devices and one access layer network device, a loop may be formed between the three network devices. If failover for the protocol (e.g., the STP) is in the order of seconds, a multi-network device link aggregation may be implemented to prevent looping.

A link aggregation (e.g., as set forth in IEEE 802.3ad) is a computer networking term which describes using multiple links (e.g., Ethernet network cables and/or ports in parallel) as one logical port to increase the link speed beyond the limits of any one single link. Other terms used for link aggregation may include Ethernet trunking, port teaming, network interface card (NIC) bonding, link bundling, and/or a link aggregation group (LAG). A LAG will be used hereinafter to refer to link aggregation.

Current implementations of a multi-network device LAG are either restricted to two network devices (e.g., a two switch aggregation layer model) or have one of the links of the multi-network device LAG in a passive mode. The passive link will switch over to an active mode when an active link becomes disabled (e.g., non-operational). However, these arrangements provide no scalable way to implement a LAG across multiple (e.g., more than two) network devices.

SUMMARY

According to one aspect, a method may be implemented by a network device. The method may include determining, by the network device, whether the network device has a local link for a link aggregation group (LAG), and identifying, by the network device and when the network device has a local link for the LAG, the network device as a designated forwarder for the LAG. The method may also include identifying, by the network device and when the network device does not have a local link for the LAG, a closest network device to the network device, with a local link for the LAG, as the designated forwarder for the LAG. The method may further include determining, by the network device, whether changes occur in the LAG, and re-determining, by the network device and when changes occur in the LAG, whether the network device has a local link for the LAG.

According to another aspect, a network device may include a memory to store a plurality of instructions, and a processor to execute instructions in the memory to determine whether the network device has a local link for a link aggregation group (LAG). The processor may further execute instructions in the memory to identify, when the network device has a local link for the LAG, the network device as a designated forwarder for the LAG, and identify, when the network device does not have a local link for the LAG, a closest network device to the network device, with a local link for the LAG, as the designated forwarder for the LAG.

According to still another aspect, one or more non-transitory computer-readable media may store instructions executable by one or more processors. The media may store one or more instructions for determining whether the network device has a local link for a link aggregation group (LAG), and identifying, when the network device has a local link for the LAG, the network device as a designated forwarder for the LAG. The media may also store one or more instructions for identifying, when the network device does not have a local link for the LAG, a closest network device to the network device, with a local link for the LAG, as the designated forwarder for the LAG, determining whether changes occur in the LAG, and re-determining, when changes occur in the LAG, whether the network device has a local link for the LAG. The media may further store one or more instructions for receiving a packet from another network device, determining whether the packet is permitted to be forwarded by the identified designated forwarder, forwarding the packet to the identified designated forwarder, when the packet is permitted to be forwarded by the identified designated forwarder, and dropping the packet when the packet is not permitted to be forwarded by the identified designated forwarder.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 4A and 4B are diagrams of an example implementation of a portion of the network depicted in FIG. 1;

FIG. 5 is a diagram of example functional components of one of the network devices illustrated in FIGS. 1, 4A, and/or 4B;

FIG. 6 is a diagram of an example portion of a table capable of being generated and/or maintained by one of the network devices illustrated in FIGS. 1, 4A, and/or 4B; and FIGS. 7 and 8 are flow charts of an example process for providing scalable multi-device link aggregation according to implementations described herein.

DETAILED DESCRIPTION

The following detailed description refers to the accompanying drawings. The same reference numbers in different drawings may identify the same or similar elements.

Systems and/or methods described herein may provide a scalable LAG for multiple (e.g., more than two) network devices. For every LAG configured for the network devices, the systems and/or methods may provide a designated forwarder table that maps a given packet source to a designated forwarder. A designated forwarder for a particular LAG may be a network device to which one or more other network devices send packets destined for the particular LAG. The designated forwarder table may be provided locally in each network device and need not be synchronized to other network devices.

In an example implementation, the systems and/or methods may determine whether a particular network device has a local link for a LAG of network devices. If the particular network device has a local link for the LAG, the systems and/or methods may identify the particular network device as a designated forwarder for the LAG. If the particular network device does not have a local link for the LAG, the systems and/or methods may identify a closest network device (e.g., to the particular network device) as the designated forwarder for the LAG. If changes occur to the LAG, the systems and/or methods may again determine whether the particular network device has a local link for the LAG. The systems and/or methods may receive a packet from another network device, and may determine whether the packet is permitted to be forwarded by the identified designated forwarder. If the packet is permitted to be forwarded by the identified designated forwarder, the systems and/or methods may forward the packet to the identified designated forwarder for forwarding on the LAG. If the packet is not permitted to be forwarded by the identified designated forwarder, the systems and/or methods may drop the packet.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
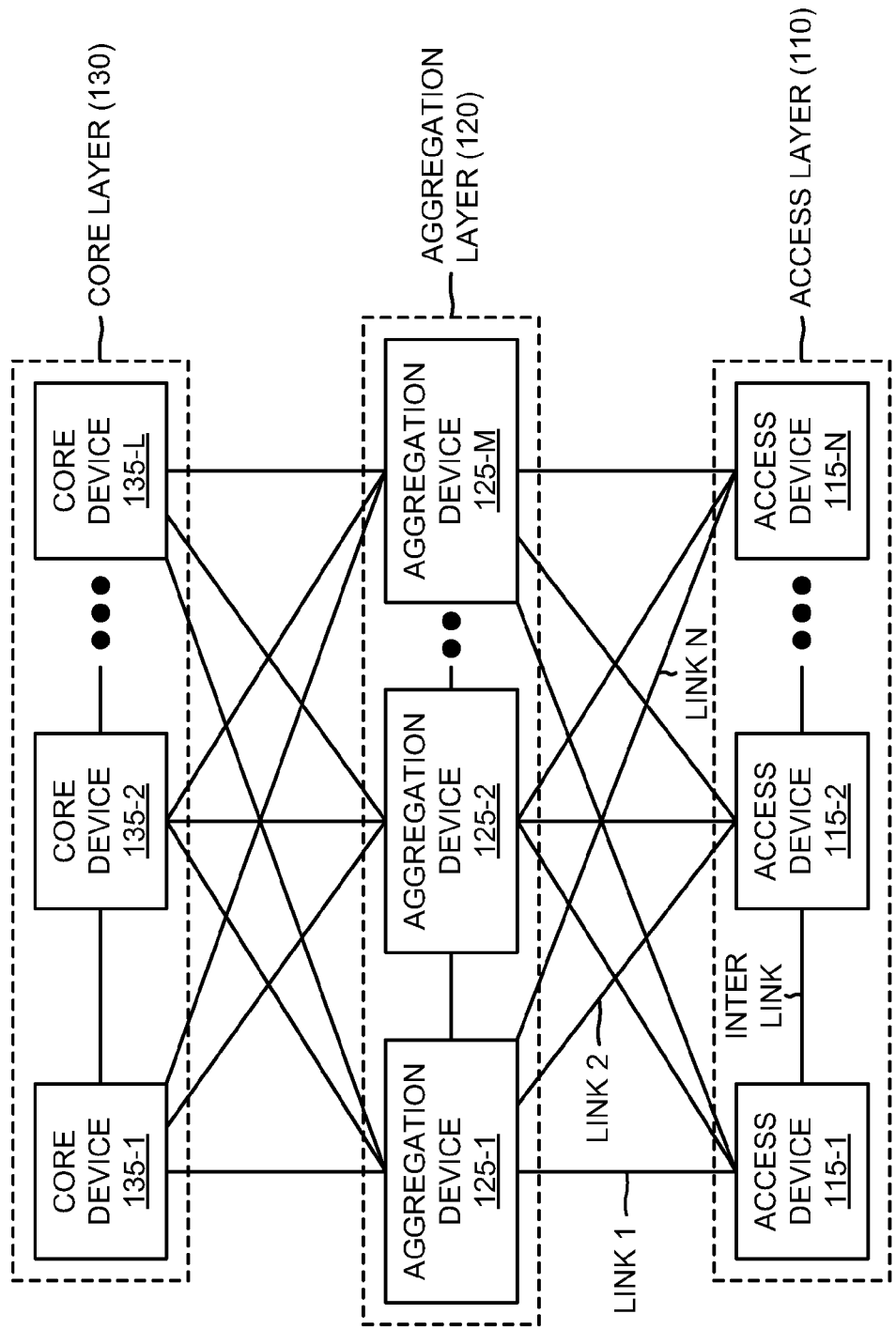
FIG. 1 is a diagram of an example network in which systems and/or methods described herein may be implemented.

FIG. 1 is a diagram of an example network 100 in which systems and/or methods described herein may be implemented. As illustrated, network 100 may include a three-tiered architecture that includes an access layer 110, an aggregation layer 120, and a core layer 130. Access layer 110 may include multiple access devices 115-1 through 115-N (collectively referred to herein as "access devices 115," and singularly as "access device 115"). Aggregation layer 120 may include multiple aggregation devices 125-1 and 125-M (collectively referred to herein as "aggregation devices 125," and singularly as "aggregation device 125"). Core layer 130 may include multiple core devices 135-1 and 135-L (collectively referred to herein as "core devices 135," and singularly as "core device 135"). In one example implementation, network 100 may correspond to a data center network or an enterprise network.

Components of network 100 may interconnect via wired and/or wireless connections or links. One access layer 110, three access devices 115, one aggregation layer 120, three aggregation devices 125, one core layer 130, and three core devices 135 have been illustrated in FIG. 1 for simplicity. In practice, there may be more access layers 110, access devices 115, aggregation layers 120, aggregation devices 125, core layers 130, and/or core devices 135. Also, in some instances, one or more of the components of network 100 may perform one or more tasks described as being performed by another one or more of the components of network 100.

Access layer 110 may include one or more networks of any type. For example, access layer 110 may include a local area network (LAN), a wide area network (WAN), a metropolitan area network (MAN), an intranet, or a combination of networks. In one example implementation, access layer 110 may include a network that provides client devices with access (e.g., via access devices 115) to network 100.

Access device 115 may include a network device, such as a gateway, a router, a switch, a firewall, a network interface card (NIC), a hub, a bridge, a proxy server, an optical add-drop multiplexer (OADM), or some other type of device that processes and/or transfers traffic. In an example implementation, access device 115 may include a device that is capable of transmitting information to and/or receiving information from aggregation layer 120 and/or aggregation devices 125.

Aggregation layer 120 may include one or more networks of any type. For example, aggregation layer 120 may include a LAN, a WAN, a MAN, an intranet, or a combination of networks.

Aggregation device 125 may include a network device, such as a gateway, a router, a switch, a firewall, a NIC, a hub, a bridge, a proxy server, an OADM, or some other type of device that processes and/or transfers traffic. In an example implementation, aggregation device 125 may include a device that is capable of transmitting information to and/or receiving information from access layer 110, access devices 115, core layer 130, and/or core devices 135. For example, aggregation device 125 may multiplex and/or demultiplex traffic between multiple access devices 115 and a link connecting aggregation device 125 to core device 135.

Core layer 130 may include one or more networks of any type. For example, core layer 130 may include a LAN, a WAN, a MAN, an intranet, or a combination of networks.

Core device 135 may include one or more computation or communication devices, that gather, process, and/or provide information in a manner described herein. In one example, core device 135 may include a server device, a laptop computer, a personal computer, a workstation computer, a network device, etc. In an example implementation, core device 135 may include a device that is capable of transmitting information to and/or receiving information from aggregation layer 120 and/or aggregation devices 125.

In one example implementation, a particular network device (e.g., one of access devices 115, aggregation devices 125, or core devices 135) may determine whether the particular network device has a local link for a LAG of network devices. If the particular network device has a local link for the LAG, the particular network device may identify the particular network device as a designated forwarder for the LAG. If the particular network device does not have a local link for the LAG, the particular network device may identify a closest network device (e.g., to the particular network device) as the designated forwarder for the LAG. If changes occur to the LAG, the particular network device may again determine whether the particular network device has a local link for the LAG. The particular network device may receive a packet from another network device, and may determine whether the packet is permitted to be forwarded by the identified designated forwarder. If the packet is permitted to be forwarded by the identified designated forwarder, the particular network device may forward the packet to the identified designated forwarder for forwarding on the LAG. If the packet is not permitted to be forwarded by the identified designated forwarder, the particular network device may drop the packet.

As further shown in FIG. 1, components of network 100 may interconnect via links. For example, aggregation device 125-1 may connect to access device 115-1 via a first link (LINK 1), may connect to access device 115-2 via a second link (LINK 2), and may connect to access device 115-N via an Nth link (LINK N). In one example, links interconnecting access devices 115 and aggregation devices 125 may form one or more LAGs. Devices at each layer (e.g., access layer 110, aggregation layer 120, and core layer 130) may interconnect with each other via inter-device links (INTER LINK). For example, access device 115-1 may interconnect with access device 115-2 via an inter-device link.

Although FIG. 1 shows example components of network 100, in other implementations, network 100 may include fewer components, different components, differently arranged components, or additional components than depicted in FIG. 1.

Figure 2:
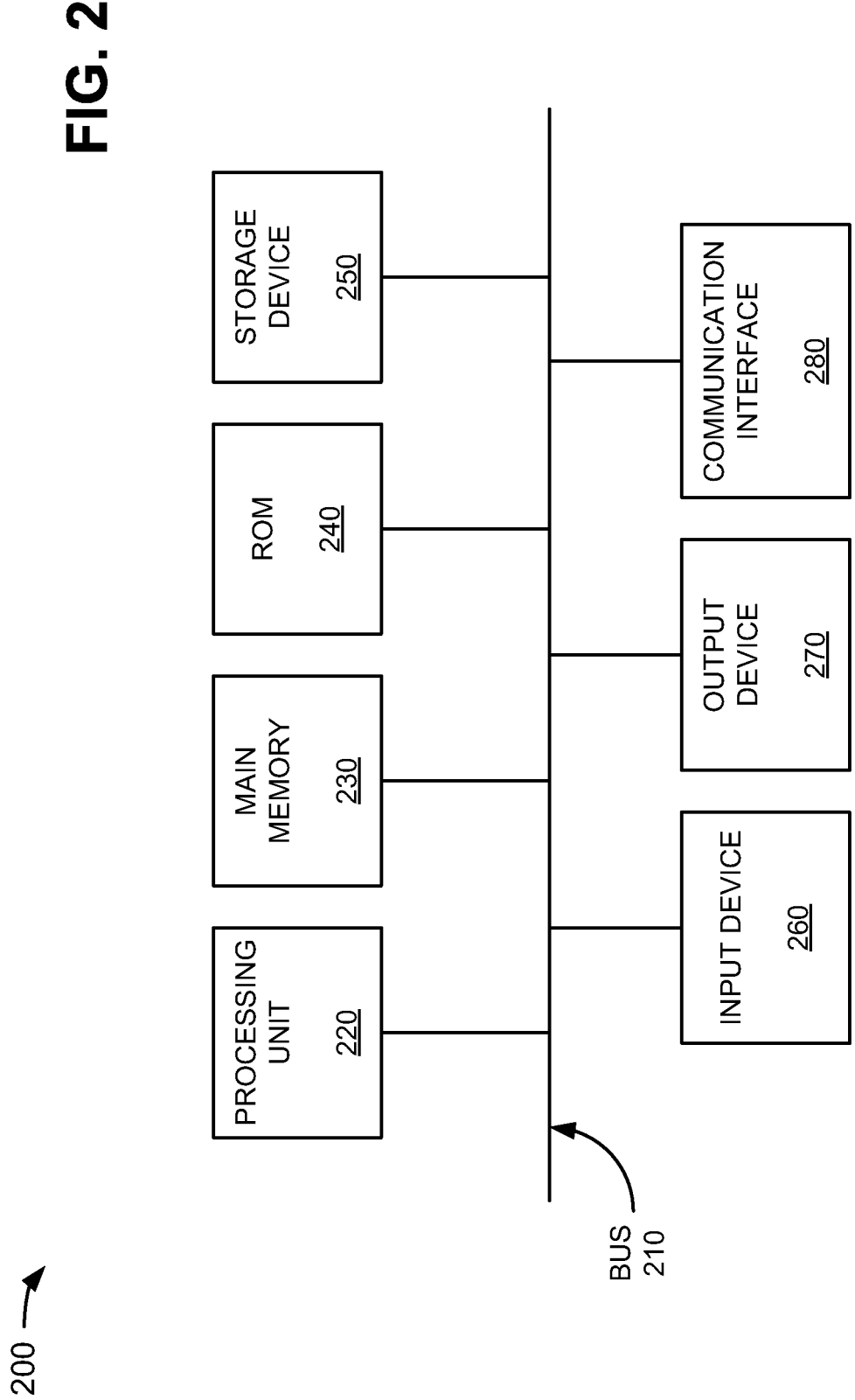
FIG. 2 is a diagram of example components of a core device depicted in FIG. 1.

FIG. 2 is a diagram of example components of a device 200 that may correspond to one of core devices 135 (FIG. 1). As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, ASICs, FPGAs, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
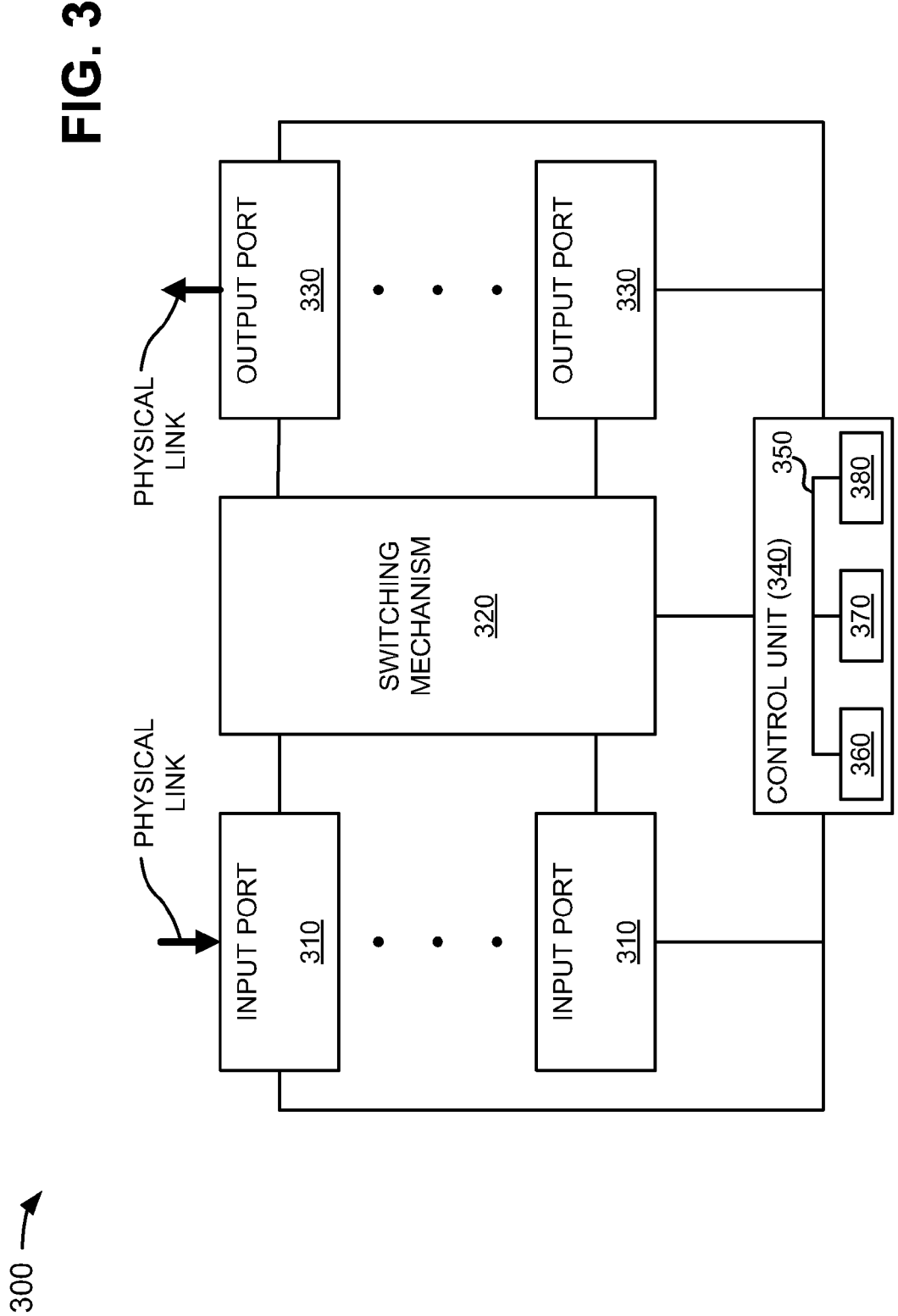
FIG. 3 is a diagram of example components of an access device or an aggregation device depicted in FIG. 1.

FIG. 3 is a diagram of example components of a device 300 that may correspond to access device 115 or aggregation device 125 (FIG. 1). In one implementation, device 300 may also correspond to core device 135 (FIG. 1). As shown, device 300 may include input ports 310, a switching mechanism 320, output ports 330, and a control unit 340.

Input ports 310 may be a point of attachment for physical links and may be a point of entry for incoming traffic (e.g., packets). Input ports 310 may carry out data link layer encapsulation and decapsulation. In example implementations, input ports 310 may send (e.g., may be an exit point) and/or receive (e.g., may be an entry point) packets.

Switching mechanism 320 may interconnect input ports 310 with output ports 330. Switching mechanism 320 may be implemented using many different techniques. For example, switching mechanism 320 may be implemented via busses, crossbars, and/or with shared memories (e.g., which may act as temporary buffers to store traffic from input ports 310 before the traffic is eventually scheduled for delivery to output ports 330).

Output ports 330 may store packets and may schedule packets for service on output links (e.g., physical links). Output ports 330 may include scheduling algorithms that support priorities and guarantees. Output ports 330 may support data link layer encapsulation and decapsulation, and/or a variety of higher-level protocols. In an example implementations, output ports 330 may send packets (e.g., may be an exit point) and/or receive packets (e.g., may be an entry point).

Control unit 340 may use routing protocols and one or more forwarding tables for forwarding packets. Control unit 340 may connect with input ports 310, switching mechanism 320, and output ports 330. Control unit 340 may compute a forwarding table, implement routing protocols, and/or run software to configure and manage device 300. Control unit 340 may handle any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input ports 310, for processing by processor 360, before a packet is directed back to the shared memories (e.g., in switching mechanism 320), queued in the shared memories (e.g., based on processing results), and eventually scheduled to be sent to output ports 330. Communication interface 380 may include any transceiver-like mechanism that enables control unit 340 to communicate with other devices and/or systems.

Device 300 may perform certain operations, as described herein. Device 300 may perform these operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4A:
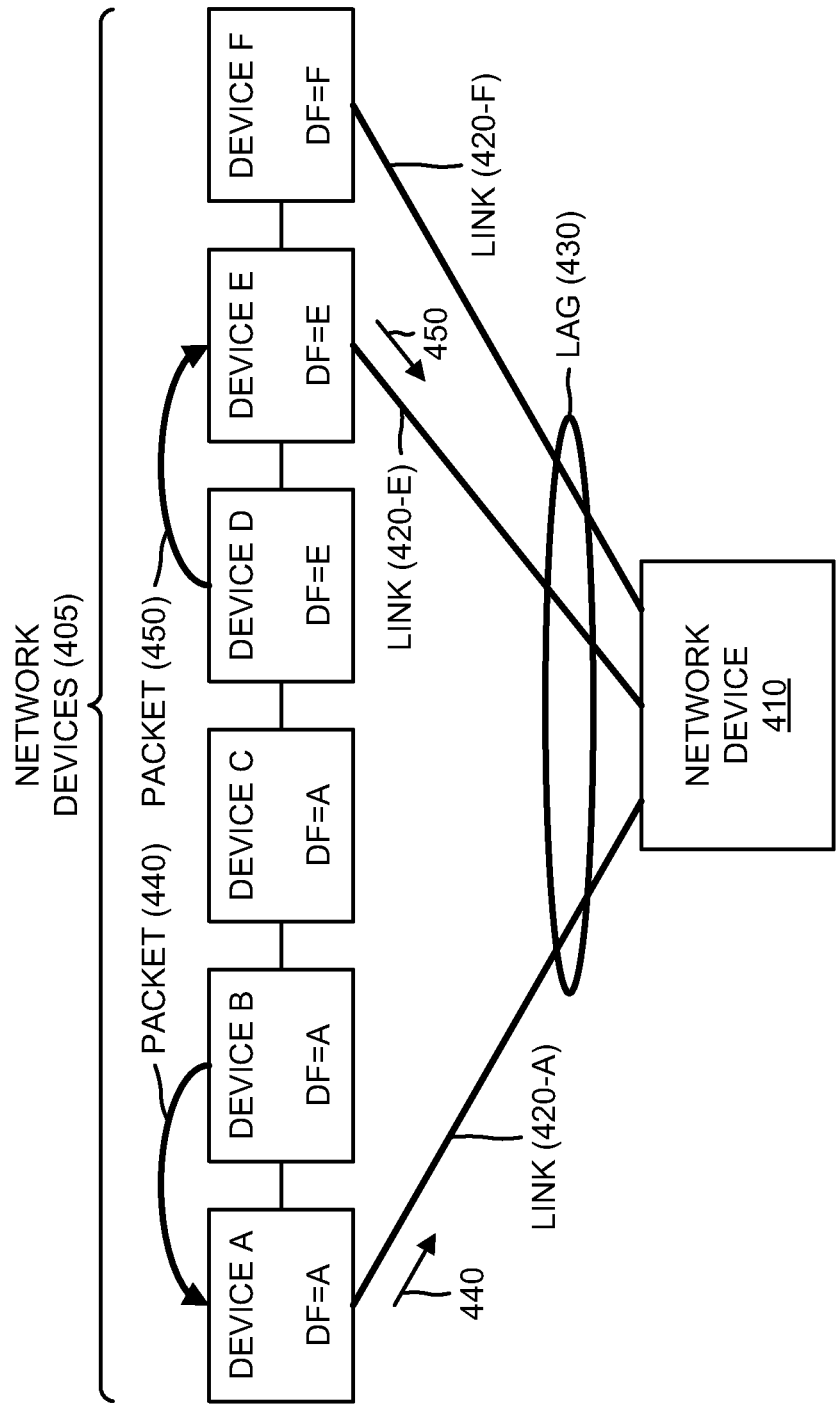

FIGS. 4A and 4B are diagrams of an example implementation of a portion 400 of network 100. As shown, example network portion 400 may include multiple network devices 405 (e.g., provided at a first layer of network portion 400) and another network device 410 (e.g., provided a second layer of network portion 400). In one example, network devices 405 may correspond to aggregation devices 125, and network device 410 may correspond to access device 115. In another example, network devices 405 may correspond to core devices 135, and network device 410 may correspond to aggregation device 125. In still another example, network devices 405 may correspond to access devices 115.

As further shown in FIG. 4A, network devices 405 may include six interconnected devices: device A, device B, device C, device D, device E, and device F. Device A may include a local link 420-A (e.g., connected to network device 410) for a LAG 430. Device E may include a local link 420-E (e.g., connected to network device 410) for LAG 430. Device F may include a local link 420-F (e.g., connected to network device 410) for LAG 430. Thus, local links 420-A, 420-E, and 420-F may be referred to as "members" of LAG 430. Although FIG. 4A depicts a single LAG (e.g., LAG 430), in other implementations, network devices 405 may create multiple, different LAGs with network device 410 and a separate designated forwarder may be applied for each of the different LAGs.

In one example implementation, each network device 405 may execute a designated forwarder (DF) method to determine a designated forwarder for a particular LAG (e.g., LAG 430). Each network device 405 may execute the designated forwarder method for all LAGs associated with network devices 405 and network device 410 (e.g., if multiple LAGs are created). For example, for device A, the designated forwarder method may include determining if device A has a local member of a LAG, and, if device A has a local member of the LAG, setting device A as the designated forwarder and setting egress packet filtering to permit packets with a packet source identity (ID) of "A." A packet source ID ("packet-src-id") may include an identity of a network device from which a packet in question entered a collection of network devices (e.g., provided in access layer 110, aggregation layer 120, or core layer 130). If device A does not have a local member of the LAG, the designated forwarder method may include finding a physically closest (or shortest path) device (e.g., device B) that has a local member of the LAG; setting the closest device as the designated forwarder; setting the inter-device link as a next hop for routes that include the LAG as the next hop; and setting, on the closest device, egress packet filtering to permit packets with a packet source identity (ID) of "A."

In one example implementation, the designated forwarder method (e.g., for device A) may include the following example logic:

If (device_local member for LAG present) {
/* DF is self */
Set DF as self;
Set egress packet filtering logic to allow packets coming with packet-src-id=A;
} else {
/* Here the DF is some other device */
Find the closest device having a member of the given LAG
Set DF as that device
For all the routes having the next hop as this LAG, set the Inter Device Link as the next hop
On the chosen DF, set the egress packet filtering logic to allow packets coming with packet-src-id=A;
}.

As shown in FIG. 4A, if each of network devices 405 executes the designated forwarder method, device A may determine itself as a designated forwarder (e.g., "DF=A") for LAG 430 since device A has a local link (e.g., link 420-A) included in LAG 430. Since device B and device C do not have local links in LAG 430, device B and device C may determine device A (e.g., a closest network device 405 to device B and device C) as their designated forwarder (e.g., "DF=A") for LAG 430. Alternatively, device C may determine device E as its designated forwarder for LAG 430 (e.g., since device E is a same number of hops from device C as device A). Since device D does not have a local link in LAG 430, device D may determine device E (e.g., a closest network device 405 to device D) as its designated forwarder (e.g., "DF=E") for LAG 430. Device E may determine itself as a designated forwarder (e.g., "DF=E") for LAG 430 since device E has a local link (e.g., link 420-E) included in LAG 430. Device F may determine itself as a designated forwarder (e.g., "DF=F") for LAG 430 since device F has a local link (e.g., link 420-F) included in LAG 430.

As further shown in FIG. 4A, packets may be forwarded by network devices 405 based on the determined designated forwarders. For example, if device B generates a packet 440 (e.g., with a packet source ID of "B") or receives packet 440 (e.g., for forwarding), device B may forward packet 440 to its designated forwarder (e.g., device A). Device A may receive packet 440, and may forward packet 440 via link 420-A (of LAG 430) to network device 410. In another example, if device D generates a packet 450 (e.g., with a packet source ID of "D") or receives packet 450 (e.g., for forwarding), device D may forward packet 450 to its designated forwarder (e.g., device E). Device E may receive packet 450, and may forward packet 450 via link 420-E (of LAG 430) to network device 410. If device D attempted to forward packet 450 to device A (rather than device E), device A may receive packet 450. However, since device E is the designated forwarder of device D, device A's egress filtering table may be programmed to not permit packets from device D to be forwarded any further. Thus, device A may not forward packet 450 any further, but rather may drop packet 450.

In one example, in prior arrangements, if a "flooded" packet (e.g., a broadcast packet that may be sent to all ports of a network) is received by device D, the packet may be flooded onto all of the devices (e.g., devices A through F). In implementations described herein, the flooded packet may not be forwarded out of all the LAG links. The packet may be forwarded by device E because device E is the designated forwarder for device D. The principle of a LAG (i.e., flooded packets may be sent on one of the LAG links) may thus be maintained.

Network devices 405 may re-execute the designated forwarder method (e.g., which may change determinations of designated forwarders) if changes occur in one or more LAGs (e.g., LAG 430) associated with network devices 405. For example, network devices 405 may re-execute the designated forwarder method if a last member of a particular LAG (e.g., LAG 430) becomes non-operational, or if a first member of a particular LAG (e.g., LAG 430) becomes operational. In one example, a LAG may have two links on device A, one link on device B, and one link of device C. If a first link on device A becomes nonoperational, the designated forwarder method may not be re-executed. However, if both links on device A become nonoperational, the designated forwarder method may be re-executed. In another example, network devices 405 may re-execute the designated forwarder method if a change occurs in an inter-device link, which may change a shortest path between two network devices 405. In this case, routes with a next hop as the particular LAG (e.g., LAG 430) may be altered to point to a new inter-device link which has a shortest path to a designated forwarder.

For example, as shown in FIG. 4B, if a local link 420-B of device B becomes operational and a member of LAG 430, network devices 405 may re-execute the designated forwarder method. Based on re-execution of the designated forwarder method, device B may determine itself as a designated forwarder (e.g., "DF=B") for LAG 430, as indicated by reference number 460, since device B now has a local link (e.g., link 420-B) included in LAG 430. Based on re-execution of the designated forwarder method, device C may now determine device B (e.g., a closest network device 405 to device C) as its designated forwarder (e.g., "DF=B") for LAG 430, as indicated by reference number 470. As further shown in FIG. 4B, if device B generates packet 440 (e.g., with a packet source ID of "B") or receives packet 440 (e.g., for forwarding), device B may directly forward packet 440 via link 420-B (of LAG 430) to network device 410.

Although FIGS. 4A and 4B show example components of network portion 400, in other implementations, network portion 400 may include fewer components, different components, differently arranged components, or additional components than depicted in FIGS. 4A and 4B. Alternatively, or additionally, one or more components of network portion 400 may perform one or more other tasks described as being performed by one or more other components of network portion 400.

FIG. 5 is a diagram of example functional components of a device 500 that may correspond to access device 115, aggregation device 125, or core device 135. In one implementation, the functions described in connection with FIG. 5 may be performed by one or more components of device 200 (FIG. 2) or device 300 (FIG. 3). As illustrated in FIG. 5, device 500 may include a designated forwarder determiner 510 and a designated forwarder (DF) table creator 520.

Designated forwarder determiner 510 may include hardware or a combination of hardware and software that may receive LAG information 530 and link information 540. LAG information 530 may include a list of one or more LAGs associated with device 500. For example, LAG information 530 may include information identifying LAG 430. Link information 540 may include information identifying which links (e.g., of network devices 405) are associated with each of the one or more LAGs identified by LAG information 530. Designated forwarder determiner 510 may utilize LAG information 530, link information 540, and the designated forwarder method (described above) to determine a designated forwarder for each of the one or more LAGs identified by LAG information 530. Designated forwarder determiner 510 may provide the determined designated forwarders, as DF information 550, to designated forwarder table creator 520.

Designated forwarder table creator 520 may include hardware or a combination of hardware and software that may receive DF information 550 from designated forwarder determiner 510, and may create a designated forwarder table (e.g., with packet source ID egress filtering) based on DF information 550. The designated forwarder table may include a table that maps each LAG to a designated forwarder. The designated forwarder table may also map a packet source ID with LAGs and designated forwarders. As further shown in FIG. 5, designated forwarder table creator 520 may receive a packet 560 (e.g., from a network device 405), and may determine whether packet 560 is permitted to be forwarded by a designated forwarder (e.g., by matching a packet source ID of packet 560 with an entry in the designated forwarder table). If designated forwarder table creator 520 determines that packet 560 is permitted to be forwarded by a designated forwarder, designated forwarder table creator 520 may forward packet 560 to the designated forwarder for forwarding on a LAG, as indicated by reference number 570. If designated forwarder table creator 520 determines that packet 560 is not permitted to be forwarded by the designated forwarder, designated forwarder table creator 520 may drop packet 560, as indicated by reference number 580.

Although FIG. 5 shows example functional components of device 500, in other implementations, device 500 may include fewer functional components, different functional components, differently arranged functional components, or additional functional components than depicted in FIG. 5. Alternatively, or additionally, one or more functional components of device 500 may perform one or more other tasks described as being performed by one or more other functional components of device 500.

FIG. 6 is a diagram of an example portion of a table 600 capable of being generated and/or maintained by one of access devices 115, aggregation devices 125, or core devices 135. In one implementation, table portion 600 may correspond to a portion of the designated forwarder table (e.g., with packet source ID egress filtering) created by device 500 (FIG. 5). As shown, table portion 600 may include a packet source ID field 610, a designated forwarder field 620, a LAG field 630, and/or a variety of entries 640 associated with fields 610-630.

Packet source ID field 610 may include entries for packet source IDs capable of being generated by network devices 405 (FIGS. 4A and 4B). For example, as shown in FIG. 6, packet source ID field 610 may include an entry identifying device A (e.g., "A"), an entry identifying device B (e.g., "B"), an entry identifying device C (e.g., "C"), an entry identifying device D (e.g., "D"), an entry identifying device E (e.g., "E"), and an entry identifying device F (e.g., "F").

Designated forwarder field 620 may include entries identifying designated forwarders of the devices identified by the packet source IDs provided in packet source ID field 620. For example, as shown in FIG. 6, designated forwarder field 620 may indicate that device A (e.g., identified by packet source ID "A") has device A as a designated forwarder; that device B and device C (e.g., identified by packet source IDs "B" and "C") have device B as a designated forwarder; that device D and device E (e.g., identified by packet source IDs "D" and "E") have device E as a designated forwarder; and that device F (e.g., identified by packet source ID "F") has device F as a designated forwarder.

LAG field 630 may include entries identifying LAGs associated with the devices identified by the packet source IDs provided in packet source ID field 620. For example, as shown in FIG. 6, LAG field 630 may indicate that device A, device B, device C, device D, device E, and device F (e.g., identified by packet source IDs "A," "B," "C," "D," "E," and "F," respectively) are associated with a particular LAG (e.g., "LAG 1").

Although FIG. 6 shows example information that may be provided in table portion 600, in other implementations, table portion 600 may contain less, different, differently arranged, or additional information than depicted in FIG. 6.

FIGS. 7 and 8 are flow charts of an example process 700 for providing scalable multi-device link aggregation according to implementations described herein. In one implementation, process 700 may be performed by one of access devices 115, aggregation devices 125, or core devices 135. In another implementation, some or all of process 700 may be performed by another device in conjunction with one of access devices 115, aggregation devices 125, or core devices 135.

As illustrated in FIG. 7, process 700 may include determining whether a particular network device has a local link for a LAG (block 710) If the particular network device has a local link for the LAG (block 710—LOCAL LINK), process 700 may include identifying the particular network device as the designated forwarder for the LAG (block 720). For example, in implementations described above in connection with FIG. 4A, each network device 405 may execute a designated forwarder (DF) method to determine a designated forwarder for a particular LAG (e.g., LAG 430). Each network device 405 may execute the designated forwarder method for all LAGs associated with network devices 405 and network device 410 (e.g., if multiple LAGs are created). In one example, for device A, the designated forwarder method may include determining if device A has a local member (e.g., has a local link) of a LAG, and, if device A has a local member of the LAG, setting device A as the designated forwarder and setting egress packet filtering to permit packets with a packet source ID of "A."

As further shown in FIG. 7, if the particular network device does not have a local link for the LAG (block 710—NO LOCAL LINK), process 700 may include identifying a closest network device, with a local link to the LAG, as the designated forwarder for the LAG (block 730). For example, in implementations described above in connection with FIG. 4A, if device A does not have a local member of the LAG, the designated forwarder method may include finding a physically closest (or shortest path) device (e.g., device B) that has a local member of the LAG; setting the closest device as the designated forwarder; setting the inter-device link as a next hop for routes that include the LAG as the next hop; and setting, on the closest device, egress packet filtering to permit packets with a packet source ID of "A."

Returning to FIG. 7, process 700 may include determining if there are changes in the LAG (block 740). If there are changes in the LAG (block 740—YES), process 700 may return to block 710. Otherwise (block 740—NO), process 700 may include receiving a packet from another network device (block 750). For example, in implementations described above in connection with FIG. 4A, network devices 405 may re-execute the designated forwarder method (e.g., which may change determinations of designated forwarders) if changes occur in one or more LAGs (e.g., LAG 430) associated with network devices 405. Packets may be forwarded by network devices 405 based on the determined designated forwarders. For example, if device B generates a packet 440 (e.g., with a packet source ID of "B") or receives packet 440 (e.g., for forwarding), device B may forward packet 440 to its designated forwarder (e.g., device A).

As further shown in FIG. 7, process 700 may include determining whether the packet is permitted to be forwarded by the determined designated forwarder (block 760). If the packet is permitted to be forwarded by the determined designated forwarder (block 760—YES), process 700 may include forwarding the packet to the determined designated forwarder for forwarding on the LAG (block 770). If the packet is not permitted to be forwarded by the determined designated forwarder (block 760—NO), process 700 may include dropping the packet (block 780). For example, in implementations described above in connection with FIG. 5, designated forwarder table creator 520, of device 500, may receive packet 560 (e.g., from a network device 405), and may determine whether packet 560 is permitted to be forwarded by a designated forwarder (e.g., by matching a packet source ID of packet 560 with an entry in the designated forwarder table). If designated forwarder table creator 520 determines that packet 560 is permitted to be forwarded by a designated forwarder, designated forwarder table creator 520 may forward packet 560 to the designated forwarder for forwarding on a LAG, as indicated by reference number 570. If designated forwarder table creator 520 determines that packet 560 is not permitted to be forwarded by the designated forwarder, designated forwarder table creator 520 may drop packet 560, as indicated by reference number 580.

Process block 740 may include the process blocks depicted in FIG. 8. As shown in FIG. 8, process block 740 may include receiving an indication that a last member of the LAG becomes non-operational (block 800), receiving an indication that a first member of the LAG becomes operational (block 810), or receiving an indication of a change in inter-network device link(s) (block 820). For example, in implementations described above in connection with FIG. 4A, network devices 405 may re-execute the designated forwarder method if a last member of a particular LAG (e.g., LAG 430) becomes non-operational, or if a first member of a particular LAG (e.g., LAG 430) becomes operational. In another example, network devices 405 may re-execute the designated forwarder method if a change occurs in an inter-device link, which may change a shortest path between two network devices 405. In this case, routes with a next hop as the particular LAG (e.g., LAG 430) may be altered to point to a new inter-device link which has a shortest path to a designated forwarder.

Systems and/or methods described herein may provide a scalable LAG for multiple (e.g., more than two) network devices. For every LAG configured for the network devices, the systems and/or methods may provide a designated forwarder table that maps a given packet source to a designated forwarder. A designated forwarder for a particular LAG may be a network device to which one or more other network devices send packets destined for the particular LAG. The designated forwarder table may be provided locally in each network device and need not be synchronized to other network devices.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a network device, whether the network device has a local link for a link aggregation group (LAG);
   identifying, by the network device and when the network device has a local link for the LAG, the network device as a designated forwarder for the LAG;
   identifying, by the network device and when the network device does not have a local link for the LAG, a closest network device to the network device, with a local link for the LAG, as the designated forwarder for the LAG;
   receiving, by the network device, a packet from another network device;
   determining, by the network device, whether the packet is permitted to be forwarded by the identified designated forwarder;
   forwarding, by the network device, the packet when the packet is permitted to be forwarded by the identified designated forwarder; and
   dropping, by the network device, the packet when the packet is not permitted to be forwarded by the identified designated forwarder.

2. The method of claim 1, wherein identifying the closest network device includes:
   identifying, when the network device does not have the local link for the LAG, another network device that is a shortest hop from the network device as the designated forwarder.

3. The method of claim 1, wherein forwarding the packet includes:
   forwarding, when the network device is identified as the designated forwarder, the packet on the LAG, and
   forwarding, when the closest network device is identified as the designated forwarder, the packet to the closest network device.

4. The method of claim 1, further comprising:
   determining that a change occurred in the LAG; and
   re-determining whether the network device has a local link for the LAG based on determining that the change occurred in the LAG.

5. The method of claim 1, wherein the network device includes one of:
   an access device provided in an access layer of a network,
   an aggregation device provided in an aggregation layer of the network, or
   a core device provided in a core layer of the network.

6. The method of claim 1, wherein the network device is provided at a first layer of a network and the LAG interconnects the first layer of the network to a second layer of the network.

7. The method of claim 1, wherein the network comprises a data center network or an enterprise network.

8. A network device, comprising:
   a memory to store a plurality of instructions; and
   a processor to execute the plurality of instructions to:
      determine whether the network device has a local link for a link aggregation group (LAG),
      identify, when the network device has a local link for the LAG, the network device as a designated forwarder for the LAG,
      identify, when the network device does not have a local link for the LAG, a closest network device to the network device, with a local link for the LAG, as the designated forwarder for the LAG;
      receive a packet from another network device;
      determine whether the packet is permitted to be forwarded by the identified designated forwarder;
      forward the packet when the packet is permitted to be forwarded by the identified designated forwarder; and
      drop the packet when the packet is not permitted to be forwarded by the identified designated forwarder.

9. The network device of claim 8, wherein the processor is further to the plurality of execute instructions in the memory to:
   determine that a change occurred in the LAG, and
   re-determine, based on determining that the change occurred in the LAG, whether the network device has a local link for the LAG.

10. The network device of claim 8, wherein, when determining that the change occurred in the LAG, the processor is further to execute the plurality of instructions to one or more of:
    determine that a last member of the LAG becomes non-operational,
    determine that a first member of the LAG becomes operational;
    determine that a change occurs in one or more inter-network device links; or
    calculate a shortest path for reaching the designated forwarder when one or more inter-network device links becomes operational or non-operational.

11. The network device of claim 8, wherein, when identifying the closest network device, the processor is further to execute the plurality of instructions to:
    identify, when the network device does not have the local link for the LAG, another network device that is a shortest hop from the network device.

12. The network device of claim 8, wherein when forwarding the packet, the processor is further to execute the plurality of instructions to:
    forward, when the network device is identified as the designated forwarder, the packet on the LAG; and
    forward, when the network device is not identified as the designated forwarder, the packet to the designated forwarder.

13. The network device of claim 8, wherein the network device includes one of:
    an access device provided in an access layer of a network,
    an aggregation device provided in an aggregation layer of the network, or
    a core device provided in a core layer of the network.

14. The network device of claim 8, wherein the network device is provided at a first layer of a network and the LAG interconnects the first layer of the network to a second layer of the network.

15. One or more non-transitory computer-readable media storing instructions, comprising:

one or more instructions that, when executed by one or more processors of a network device, cause the one or more processors to:
  determine whether the network device has a local link for a link aggregation group (LAG);
  identify, when the network device has a local link for the LAG, the network device as a designated forwarder for the LAG;
  identify, when the network device does not have a local link for the LAG, a closest network device to the network device, with a local link for the LAG, as the designated forwarder for the LAG;
  receive a packet from another network device;
  determine whether the packet is permitted to be forwarded by the identified designated forwarder;
  forward the packet when the packet is permitted to be forwarded by the identified designated forwarder; and
  drop the packet when the packet is not permitted to be forwarded by the identified designated forwarder.

16. The one or more non-transitory computer-readable media of claim 15, wherein the instructions further comprise:
  one or more one or more instructions that, when executed by the one or more processors, cause the one or more processors to:
    determine that a change occurred in the LAG; and
    re-determine, based on determining that the change occurred in the LAG, whether the network device has a local link for the LAG.

17. The one or more non-transitory computer-readable media of claim 15, wherein the network device includes one of:
  an access device provided in an access layer of a network,
  an aggregation device provided in an aggregation layer of the network, or
  a core device provided in a core layer of the network.

18. The one or more non-transitory computer-readable media of claim 15, wherein the network device is provided at a first layer of a network and the LAG interconnects the first layer of the network to a second layer of the network.

19. The method of claim 4, wherein determining that the change occurred in the LAG includes:
  determining that a last member of the LAG becomes non-operational;
  determining that a first member of the LAG becomes operational; or
  determining that a change occurs in one or more inter-network device links.

20. The method of claim 4, wherein determining that the change occurred in the LAG includes:
  calculating a shortest path for reaching the designated forwarder when one or more inter-network device links becomes operational or non-operational.

* * * * *